United States Patent
Asami

(10) Patent No.: US 10,005,194 B2
(45) Date of Patent: Jun. 26, 2018

(54) TOOL PATH GENERATING DEVICE AND HAIRLINE MACHINING SYSTEM

(75) Inventor: Soichiro Asami, Aiko-gun (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 987 days.

(21) Appl. No.: 14/007,930

(22) PCT Filed: Apr. 19, 2011

(86) PCT No.: PCT/JP2011/059996
§ 371 (c)(1),
(2), (4) Date: Sep. 26, 2013

(87) PCT Pub. No.: WO2012/144081
PCT Pub. Date: Oct. 26, 2012

(65) Prior Publication Data
US 2014/0013921 A1    Jan. 16, 2014

(51) Int. Cl.
*B26D 3/06* (2006.01)
*B23C 3/34* (2006.01)
*G05B 19/4093* (2006.01)

(52) U.S. Cl.
CPC ............... *B26D 3/065* (2013.01); *B23C 3/34* (2013.01); *G05B 19/40937* (2013.01);
(Continued)

(58) Field of Classification Search
CPC ............ B26D 3/065; G05B 19/40937; G05B 2219/35097; G05B 2219/36185;
(Continued)

(56) References Cited

U.S. PATENT DOCUMENTS 3,502,882 A * 3/1970 Von Voros ........... B23Q 35/128
219/124.34
5,703,782 A * 12/1997 Dundorf ............ G05B 19/4069
700/182

(Continued)

FOREIGN PATENT DOCUMENTS

| CN | 101088681 | 12/2007 |
|---|---|---|
| DE | 3631809 | 3/1987 |

(Continued)

OTHER PUBLICATIONS

Merrill Lessley and Paul Beale, "Bridges Leeuwarden: Mathematics, Music, Art, Architecture, Culture" (2008), pp. 483-484.*

(Continued)

*Primary Examiner* — Carlos Ortiz Rodriguez
(74) *Attorney, Agent, or Firm* — Morrison & Foerster LLP

(57) ABSTRACT

A tool path generating device (20) which generates a tool path (L1) for machining a hairline-shaped long narrow groove (Wa) of on a workpiece surface (W0), includes a shape data acquisition part which acquires shape data of a workpiece, a parameter setting part (23) which sets a shape parameter of a hairline corresponding to the long narrow groove (Wa), and a path generating part (24) which generates a tool path (L1) for a hairline machining, based on the shape data acquired by the data acquisition part and the shape parameter set by the parameter setting part (23).

5 Claims, 7 Drawing Sheets

(52) U.S. Cl.
CPC ............. *G05B 2219/35097* (2013.01); *G05B 2219/36185* (2013.01); *G05B 2219/50213* (2013.01); *Y02P 90/265* (2015.11); *Y10T 83/0304* (2015.04)

(58) Field of Classification Search
CPC ............. G05B 2219/50213; B23C 3/34; Y02P 90/265; Y10T 83/0304
See application file for complete search history.

(56) References Cited

U.S. PATENT DOCUMENTS

| | | | | |
|---|---|---|---|---|
| 6,459,952 | B1* | 10/2002 | Dundorf | G05B 19/4069 700/180 |
| 8,020,268 | B2 | 9/2011 | Akiyama et al. | |
| 2008/0011132 | A1 | 1/2008 | Akiyama et al. | |

FOREIGN PATENT DOCUMENTS

| | | |
|---|---|---|
| JP | 1-141014 | 6/1989 |
| JP | 10-71677 | 3/1998 |
| JP | 2000-326127 | 11/2000 |
| JP | 2001-321874 | 11/2001 |
| JP | 2002-254426 | 9/2002 |
| JP | 2006-68901 | 3/2006 |
| JP | 2008-844 | 1/2008 |
| JP | 2008-110460 | 5/2008 |
| KR | 10-0778535 | 11/2007 |

OTHER PUBLICATIONS

Office Action dated Jan. 26, 2015, directed to Korean Patent Application No. 10-2013-7025079, 8 pages.

Extended European Search Report dated Nov. 11, 2014, directed to EP Application No. 11863802.2; 6 pages.

International Search Report dated Jun. 7, 2011, directed to International Application No. PCT/JP2011/059996; 2 pages.

* cited by examiner

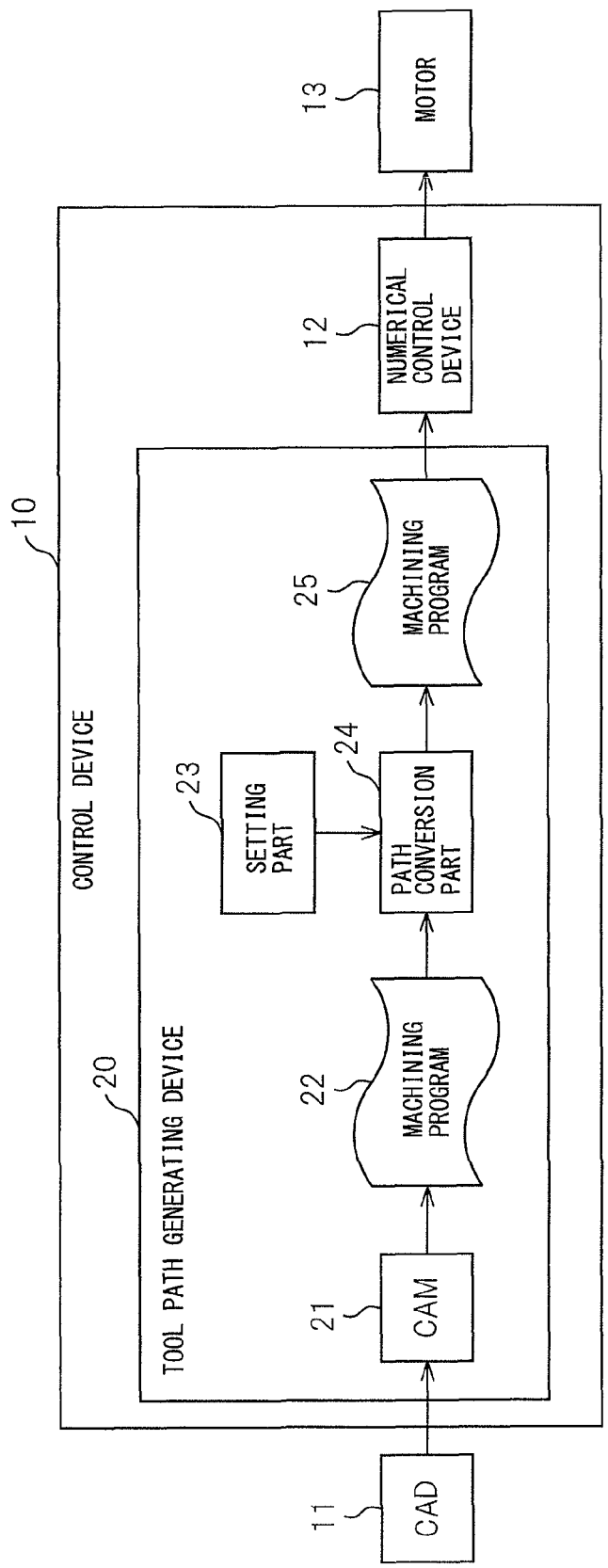

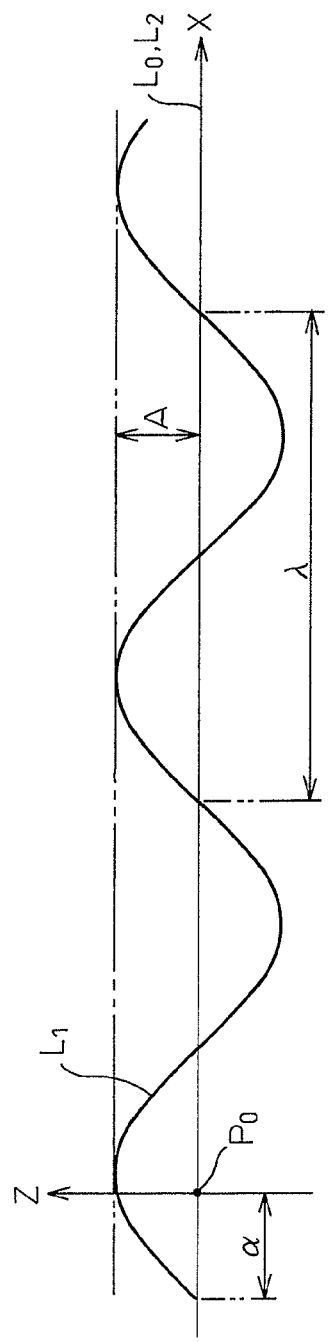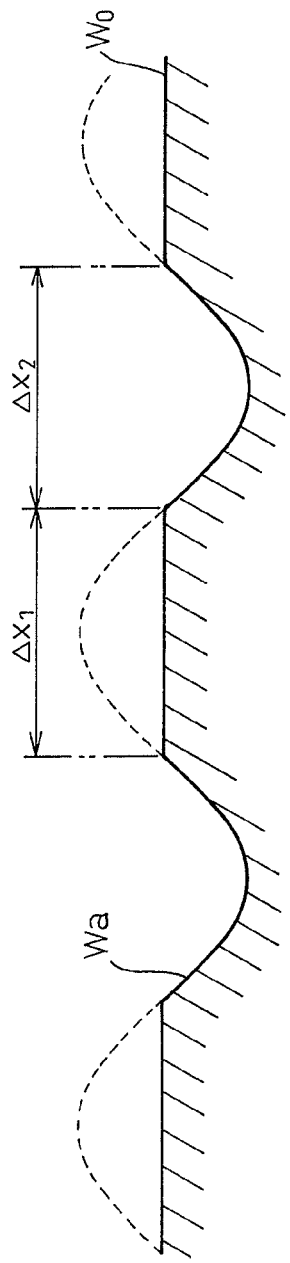

TOOL PATH GENERATING DEVICE AND HAIRLINE MACHINING SYSTEM

REFERENCE TO RELATED APPLICATIONS

This application is the national stage application under 35 USC 371 of International Application No. PCT/JP2011/059996, filed Apr. 19, 2011, the entire contents of which are incorporated herein by reference.

FIELD OF THE INVENTION

The present invention relates to a tool path generating device which generates a tool path for machining a hairline and to a hairline machining system.

BACKGROUND OF THE INVENTION

In the past, a method of arranging a transfer member with a hairline-shaped relief in a mold to form a hairline pattern on the surface of a shaped article by using in-mold shaping has been known (for example, see Patent Literature 1). However, this method requires a transfer member, so is unsuited for mass production of shaped articles.

Also, a method of rubbing the surface of a mold by sandpaper or a metal brush to form a large number of extremely fine grooves and thereby obtain a shaped article with a hairline pattern corresponding to the extremely fine grooves without using a transfer member has been known (for example, see Patent Literature 2).

However, in the method described in Patent Literature 2, since sandpaper or a metal brush is used to form the extremely fine grooves, there is a large variation in the surface shape of each mold. Therefore, it is difficult to obtain the hairline pattern of the same shape in the case of using different molds, and thus the product shapes are not stable.

Patent Literature 1
Japanese Unexamined Patent Publication No. 1-141014 A
Patent Literature 2
Japanese Unexamined Patent Publication No. 10-71677 A

SUMMARY OF THE INVENTION

The present invention is a tool path generating device generating a tool path for machining a hairline-shaped long narrow groove on a workpiece surface, which includes a shape data acquisition part acquiring shape data of a workpiece; a parameter setting part setting a shape parameter of a hairline corresponding to the long narrow groove; and a path generating part generating a tool path for a hairline machining, based on the shape data acquired by the data acquisition part and the shape parameter set by the parameter setting part.

Further, the present invention is a hairline machining system machining a hairline-shaped long narrow groove on a workpiece surface, which includes the above tool path generating device; and a machine tool causing a relative movement of a tool relative to a workpiece, in accordance with a tool path generated by the tool path generating device, and machining the long narrow groove on the workpiece surface.

BRIEF DESCRIPTION OF THE DRAWINGS

FIG. 4 is a block diagram which shows the configuration of a control device of FIG. 1.

FIG. 5A is a view which shows an example of a hairline tool path.

FIG. 5B is a cross-sectional view which shows a workpiece surface shape obtained by application of a hairline tool path of FIG. 5A.

DETAILED DESCRIPTION OF THE INVENTION

Figure 1:
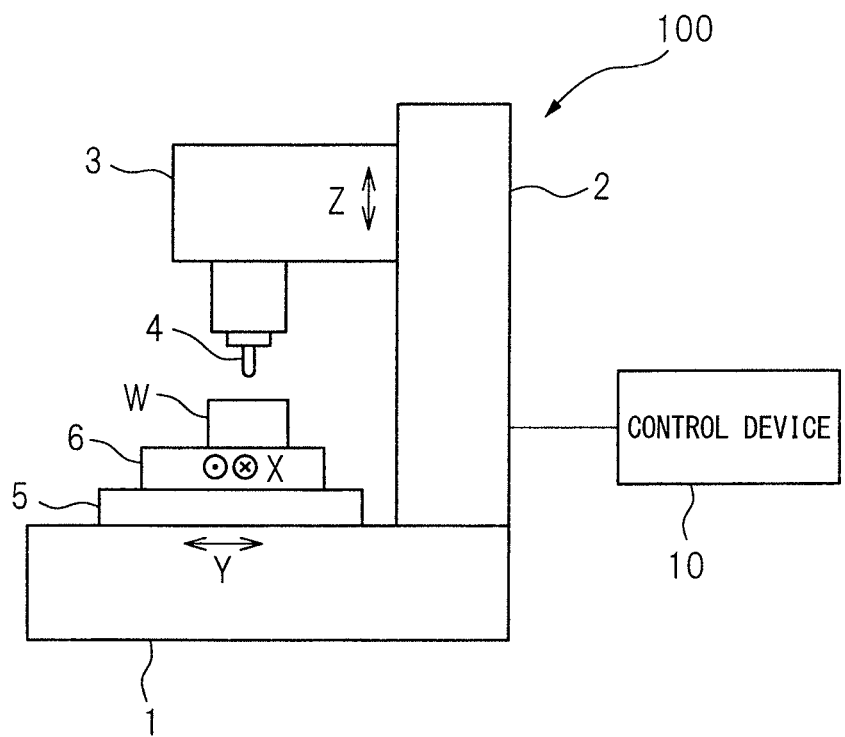
FIG. 1 is a view which shows the configuration of a hairline machining system having a tool path generating device according to an embodiment of the present invention.

Hereinafter, referring to FIG. 1 to FIG. 8B, an embodiment of a tool path generating device according to the present invention will be explained. FIG. 1 is a view which shows the configuration of a hairline machining system having a tool path generating device according to an embodiment of the present invention. This hairline machining system has a control device 10 which includes a tool path generating device and a machine tool 100 which is controlled by the control device 10. The machine tool 100 is used to machine hairlines on the workpiece surface.

Figure 2:
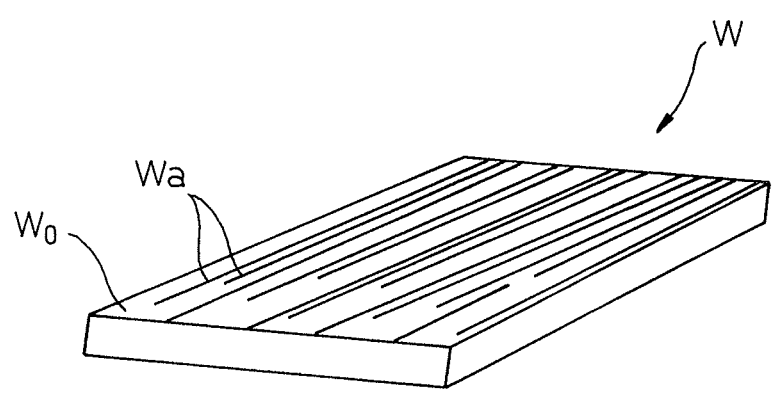
FIG. 2 is a perspective view which shows an example of a workpiece surface on which hairlines are machined by a hairline machining system of FIG. 1.

FIG. 2 is a perspective view which shows an example of a workpiece surface on which hairlines are machined by the hairline machining system of FIG. 1. "Hairlines" are fine scratches of the extents of fineness of a hair which are formed to a workpiece surface along one direction and exhibit long narrow groove shapes. In FIG. 2, by a hairline machining, the workpiece surface W0 is formed with a large number of hairline-shaped long narrow grooves Wa. Due to these long narrow grooves Wa, the workpiece surface W0 is given a streak-like hairline pattern.

The configuration of the machine tool 100 of FIG. 1 will be explained. As the machine tool 100, for example, a vertical machining center is used. A column 2 is provided on a bed 1. A spindle head 3 is supported movably at the column 2 through a linear feed mechanism in the top-down direction (Z-axis direction). A tool 4 is attached to the spindle head 3 facing downward through a spindle. The tool 4 is, for example, an end mill, drill, or other rotary tool. A rotary tool with at least a front end which is formed into a tip corresponding to the width of a long narrow groove Wa may be used. The tool 4 is driven to rotate by a spindle motor inside the spindle head 3.

A saddle 5 is supported movably on the bed 1 through the linear feed mechanism in the horizontal direction (Y-axis direction). A table 6 is supported movably on the saddle 5 in a horizontal direction perpendicular to the Y-axis direction (X-axis direction). The linear feed mechanism is configured by, for example, a ball screw and a servo motor which drives to rotate the ball screw. Due to this configuration, the tool 4 and the workpiece W move relatively in the perpendicular 3-axial directions (X-direction, Y-direction, and Z-direction) whereby a workpiece W is machined.

The spindle motor and the servo motors are controlled in accordance with a machining program by a control device 10. The machining program is set with a path of movement of the tool 4 as the tool path. The tool 4 moves relative to the workpiece W along this tool path.

The machining program is prepared utilizing a known CAD/CAM system. That is, the CAD data corresponding to the machined shape of the workpiece W is used as the basis to prepare CAM data of a set of fine linear commands. This CAM data is comprised of a massive amount of point group data. Therefore, so as to obtain an amount of data suitable for the machining program, data is thinned from the CAM data in accordance with a predetermined rule, and thus a machining program including a plurality of machining command points is prepared.

Figure 3A:
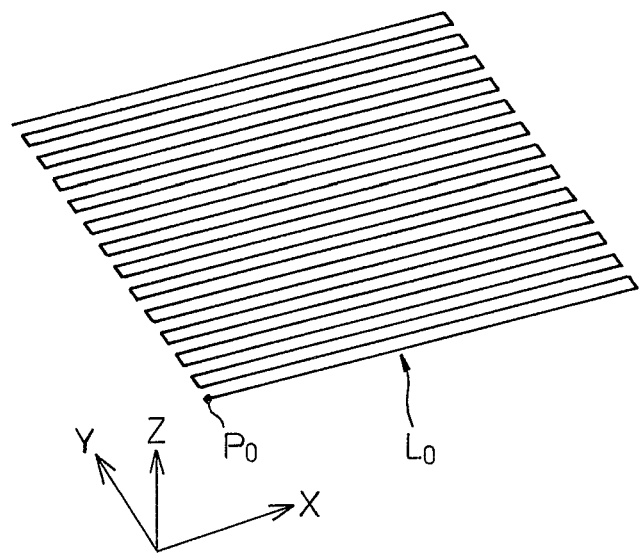
FIG. 3A is a perspective view which shows an example of a reference tool path.

FIG. 3A is a perspective view which shows an example of a tool path L0 obtained by CAM data (called "reference tool path"). FIG. 3A shows a reference tool path L0 at the time of machining a flat part which extends on an XY plane (corresponding to workpiece surface W0 of FIG. 2). The reference tool path L0 is started from the machining start point P0 and is configured by a plurality of connected machining paths which move straight back and forth along the X-direction while being shifted by predetermined amounts in the Y-direction.

Figure 3B:
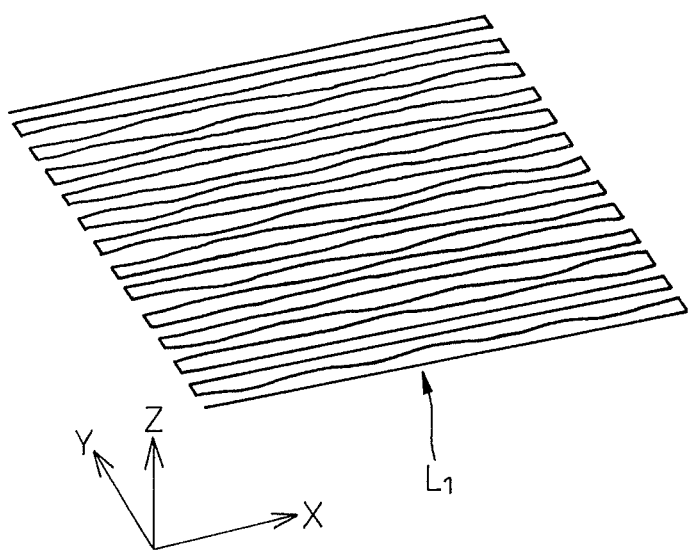
FIG. 3B is a perspective view which shows an example of a hairline tool path.

In the present embodiment, by processing inside the control device 10, the reference tool path L0 is generated and a waveform-shaped hairline is applied to this reference tool path L0 in the XZ plane vertical to the XY plane. Due to this, the reference tool path L0 is converted to a tool path L1 for a hairline machining (called "hairline tool path") whereby, as shown in FIG. 3B, a hairline tool path L1 is generated.

FIG. 4 is a block diagram which shows the configuration of a control device 10. The control device 10 has a tool path generating device 20 which generates a reference tool path L0 based on shape data of a CAD 11 and which converts the reference tool path L0 to the hairline tool path L1, and a numerical control device 12 which controls motors 13 for driving feed shafts provided at a machine tool 100 to cause a relative movement of the tool 4 relative to a workpiece W along the hairline tool path L1. The numerical control device 12 includes a program reading part which reads NC data set in a machining program 25 of the tool path generating device 20, an acceleration/deceleration control part which controls acceleration/deceleration of the motors 13 of the machine tool 100, and an interpolation calculator which calculates target amounts of movement in the X-direction, Y-direction, and Z-direction feed axes.

The tool path generating device 20 has a CAM 21 which prepares a machining program 22 including the reference tool path L0 based on shape data of the CAD 11, a setting part 23 which sets various setting values relating to the hairline which is formed on the workpiece surface, and a path conversion part 24 which prepares a machining program 25 including the hairline tool path L1 based on data from the CAM 21 and setting values at the setting part 23.

The setting part 23 is configured including a control panel or keyboard or other input device and a storage device which stores input values input through the input device. The setting part 23 sets shape parameters of the hairline and limit values of the hairline shapes, etc. That is, it sets the initial phase, amplitude, wavelength, and other shape parameters of the hairline which exhibits a waveform shapes, and the maximum values and minimum values and other limit values of the amplitude and wavelength.

The path conversion part 24 is configured including a processing device which has a CPU, ROM, RAM, etc. The path conversion part 24 applies the hairline to the reference tool path L0 based on the shape parameters set by the setting part 23 to convert the reference tool path L0 to the hairline tool path L1, and prepares a machining program 25.

FIG. 5A is a view which shows an example of a hairline tool path L1. In FIG. 5A, the hairline tool path L1 is shown by a sine wave on the XZ axis. In the sine wave of the figure, the relationship between the distance X from the machining start point P0 and the displacement Z from the X-axis is expressed by the following formula (I):

$$Z = A \cdot \sin((2\pi/\lambda) \cdot X + \alpha) \quad (I)$$

In the formula (I), $\alpha$, A, and $\lambda$ are respectively the initial phase, amplitude, and wavelength. Therefore, if the setting part 23 sets the initial phase $\alpha$, amplitude A, and wavelength $\lambda$ as shape parameters of the hairline and sets the positional relationship between the reference line (X-axis) of the sine wave and the reference tool path L0 (amount of deviation $\Delta Z$ in Z-direction), it is possible to unambiguously determine the waveform shape of the hairline at the path conversion part 24. In FIG. 5A, the reference tool path L0 is positioned on the X-axis, and $\Delta Z$ is set to 0.

FIG. 5B is a cross-sectional view which shows a surface shape of a workpiece W formed by the hairline tool path L1 of FIG. 5A. FIG. 5B, for example, shows an example of machining the workpiece surface W0 into a predetermined shape along the reference tool path L0, then machining to form a hairline on the workpiece surface W0 along the hairline tool path L1. Therefore, at the time of the hairline machining, in the range $\Delta x1$ where the tool path L1 passes above from the reference tool path L0, the tool 4 runs above the workpiece surface W0 (dotted line), while in the range $\Delta x2$ where the tool path L1 runs below the reference tool path L0, the workpiece surface W0 is machined along the tool path L1 (solid line). For this reason, in FIG. 5B, the long narrow grooves Wa are discontinuously formed at the workpiece surface W0.

The machining operation of the workpiece surface W0 along the reference tool path L0 and the hairline machining operation along the hairline tool path L1 need not be performed separately. These operations can also be performed at one time. In this case, the tool path setting part 24 judges if the hairline tool path L1 shown in FIG. 5A is positioned below the reference tool path L0 (workpiece side), and in the range $\Delta x2$ where L1 is positioned below L0, L1 may be made the tool path as it is to prepare the machining program 25 for the hairline machining. On the other hand, in the range $\Delta x1$ where L1 is positioned above L0, L0 may be made the tool path to prepare the machining program 25 for machining the workpiece surface.

Figure 6A:
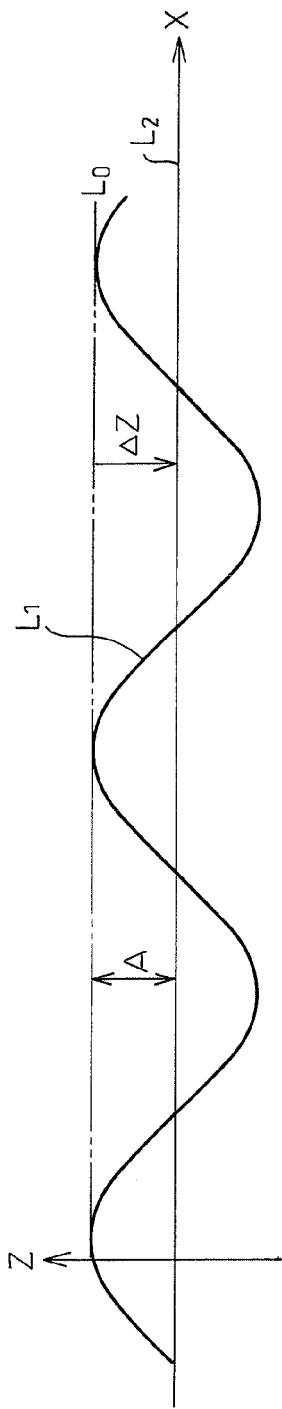
FIG. 6A is a view which shows a modification of FIG. 5A.
Figure 6B:
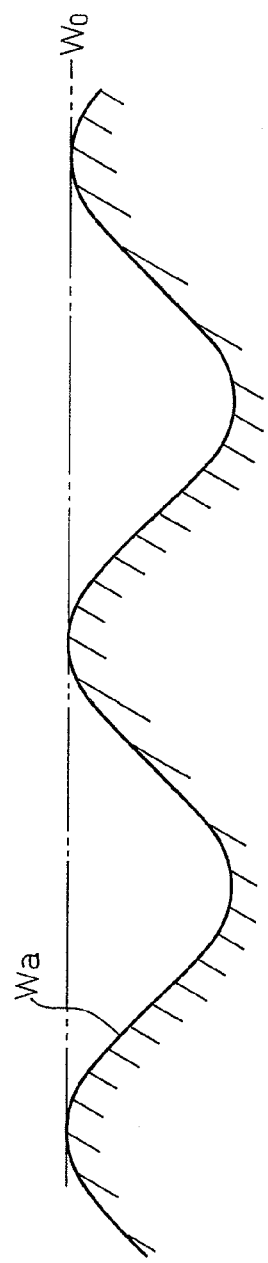
FIG. 6B is a cross-sectional view which shows a workpiece surface shape obtained by application of a hairline tool path of FIG. 6A.

Although, in FIG. 5A, the amount of deviation $\Delta Z$ of the reference line L2 (X-axis) of the hairline waveform from the reference tool path L0 is made 0, $\Delta Z$ may also be set to a value other than 0. FIG. 6A is a view which shows an example of this. In FIG. 6A, $\Delta Z$ is set equal to the amplitude A. Due to this, as shown in FIG. 6B, a hairline-shaped long narrow groove Wa is continuously formed on the workpiece surface W0. $\Delta Z$ may be set larger than or smaller than the amplitude A. When machining a hairline on the workpiece surface W0 leaving a finishing margin, this margin may be considered in setting ΔZ.

The initial phase α, amplitude A, and wavelength λ of the above formula (I) may be set as constants. However, these values may also be set as variables which have reproducibility. For example, random numbers R which have reproducibility may also be used to set α, A, and λ. Here, "have reproducibility" means the case of being able to generate the same string of random numbers. For example, it is possible to obtain them by using the linear congruential method shown by the following formula (II).

$$Rn+1=(B \cdot Rn+C) \bmod M \qquad (II)$$

In the above formula (II), B, C, and M are constants. If inputting the initial value R0 for Rn in the above formula (II), a pseudo random number string R1, R2, . . . having periodicity is generated. That is, the random number string is determined unambiguously in accordance with the constants B, C, and M and the initial value R0.

When using such a random number string to set the initial phase α, amplitude A, and wavelength λ, if setting the function α=f1(R) expressing the relationship between the initial phase α and the random number R, the function A=f2(R) expressing the relationship between the amplitude A and the random number R, and the function λ=f3(R) expressing the relationship between the wavelength λ and the random number R in advance, it is possible to use the random number R as a parameter to calculate the initial phase α, amplitude A, and wavelength λ.

Specifically, the above formula (II) is used to calculate the random number string R1, R2, . . . , then for example, the random number R1 is used as a parameter to calculate the initial phase α by α=f1(R1). The amplitude A1, A2, . . . , An of the first cycle, the second cycle, . . . , the n-th cycle are successively calculated using the random number string R1, R2, . . . , Rn as parameters by A1=f2(R1), A2=f2(R2), . . . , An=f2(Rn). The wavelengths λ1, λ2, . . . , λn of the first cycle, the second cycle, . . . , the n-th cycle are successively calculated using the random number string R1, R2, . . . , Rn as parameters by λ1=f3(R1), λ2=f3(R2), . . . , λn=f3(Rn). The calculated initial phase α and amplitudes A and wavelengths λ corresponding to the different cycles are set as shape parameters. By entering these shape parameters in the above formula (I), it is possible to determine the hairline waveform for each cycle.

In this case, in calculating the amplitude A and wavelength λ, it is sufficient to consider the maximum values and the minimum values of the amplitude A and wavelength λ predetermined at the setting part 23, and calculate the amplitude A and wavelength λ within the ranges of the maximum values and the minimum values. Due to this, it is possible to form a hairline pattern which keeps the amplitude A and the wavelength λ within the predetermined ranges. The above functions f2(R) and f3(R) may be set so that the amplitude A and the wavelength λ become within the ranges of the maximum values and minimum values.

The setting of the initial phase α, amplitude A, and wavelength λ by using the above random number R can be carried out by the setting part 23 by giving the setting part 23 a processing function. It is also possible to set only various setting values B, C, M, and R0 by the setting part 23 and use these setting values to calculate the initial phase α, amplitude A, and wavelength λ by the path conversion part 24.

Figure 7A:
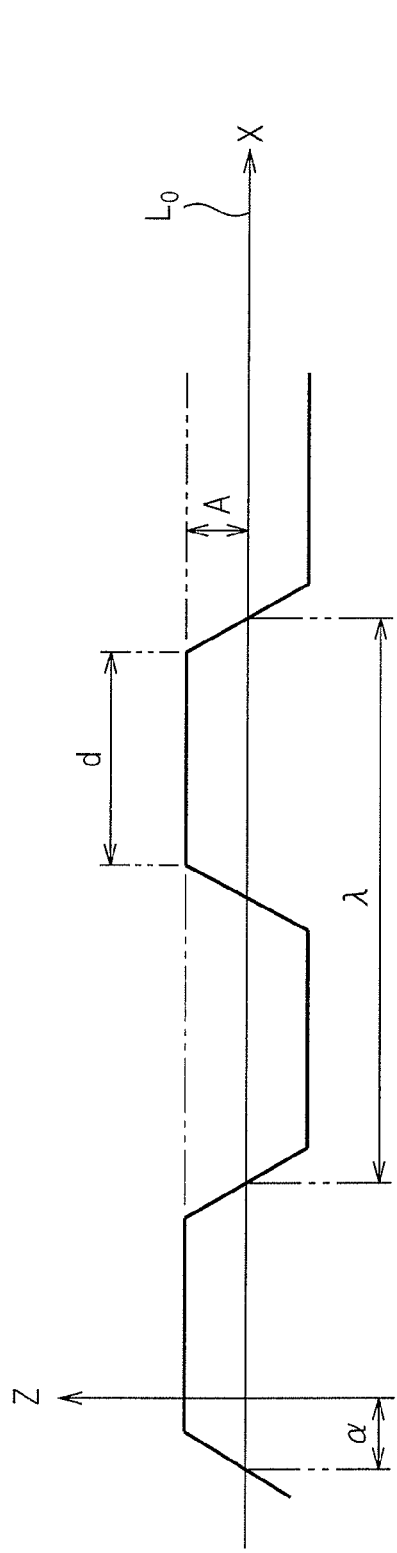
FIG. 7A is a view which shows another modification of FIG. 5A.

Above, the case for giving a hairline by sine waves is explained. However, waves other than sine waves may also be used to constitute a hairline. FIG. 7A shows the configuration of the hairline by rectangular waves. In this example, the initial phase α, amplitude A, wavelength λ, and horizontal distance "d" of the hairline waveform are set as shape parameters by the setting part 23. These shape parameters may be set using a random number R in the same way as explained above. In this case, it is also possible to set the maximum values and minimum values of the amplitude A, wavelength λ, and horizontal distance "d" in advance and calculate the values A, λ, and "d" within the ranges of the maximum values and minimum values.

Figure 7B:
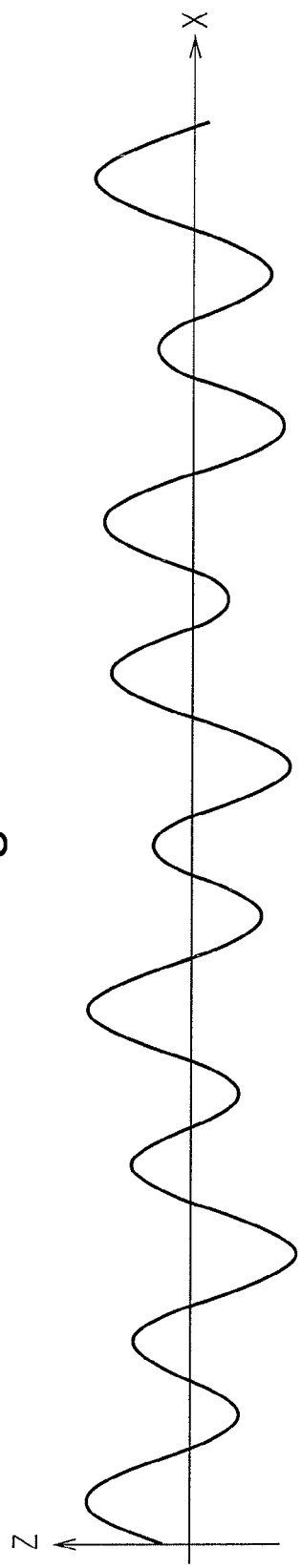
FIG. 7B is a view which shows still another modification of FIG. 5A.

FIG. 7B shows an example of a hairline configured by a combined wave. In this example, two sine waves are combined to generate a combined wave. The combined wave in this case is expressed by the following formula (III):

$$y=2 \sin(\exp(1)x)+\sin(x+\log(2)) \qquad (III)$$

Figure 8A:
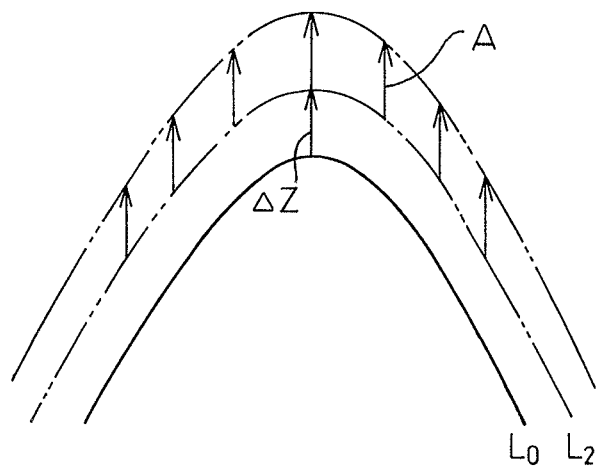
FIG. 8A is a view which shows an example of hairlines formed to a curved workpiece surface in an amplitude direction.

The operation of the hairline machining system according to the present embodiment may be summarized as follows:

First, as the operation of the tool path generating device 20, the shape data of the workpiece W obtained by the CAD 11 is input into the CAM 21. The CAM 21 prepares a machining program 22 including the reference tool path L0 based on this CAD data. When the workpiece W is, for example, a mold having a curved part, as shown in FIG. 8A, the CAM 21 generates a reference tool path L0 of a curved shape along the workpiece surface.

On the other hand, the setting part 23 is set in advance with shape parameters of the hairline which is formed on the workpiece surface. For example, when configuring the hairline waveform by a sine wave and using the random number string obtained by the linear congruential method to set the initial phase α, amplitude A, and wavelength λ, the constants B, C, and M and the initial value R0 of the above formula (II) are set in advance by the user. The deviation ΔZ from the reference tool path L0 (workpiece surface W0) to the reference line L2 of the hairline waveform is also set.

Figure 8B:
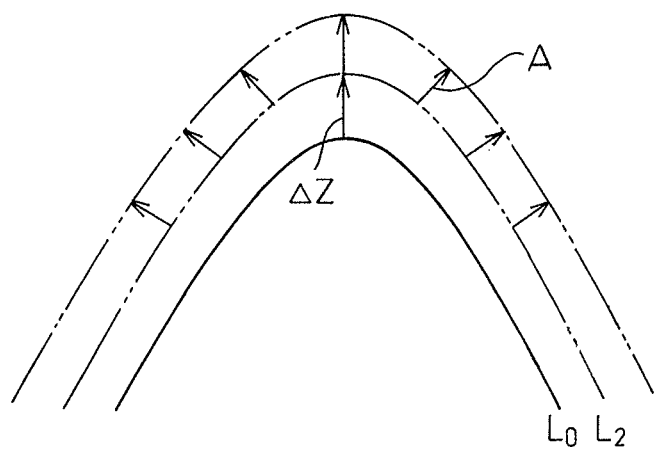
FIG. 8B is a view which shows another example of hairlines formed to a curved workpiece surface in an amplitude direction.

The path conversion part 24 adds a hairline to the reference tool path L0 based on the shape parameters set by the setting part 23 to convert the reference tool path L0 to the hairline tool path L1 and prepare the machining program 25. In this case, the amplitude A of the hairline is, for example, as shown by the arrow of FIG. 8A, set toward a predetermined direction. As shown by the arrow of FIG. 8B, it is also possible to set the amplitude A toward the normal vector direction of the reference tool path L0.

The numerical control device 12 control the motors 13 for driving feed axes of the machine tool 100 based on the NC data set at the machining program 25. Due to this, it is possible to machine hairline-shaped long narrow grooves Wa on the workpiece surface W0. If, in the above way, for example forming long narrow grooves Wa on the surface of a mold, then using this mold to form a shaped article, a hairline pattern is given to the surface of the shaped article by transfer of the long narrow grooves Wa.

In this case, the long narrow grooves Wa are unambiguously determined in shape in accordance with the shape parameters of the hairline set by the setting part 23, so it is possible to obtain a plurality of molds having the same surface shapes. Therefore, even if using different molds, it is possible to give the same hairline pattern to the surfaces of shaped articles. The workpiece W may be other than a mold. For example, it is also possible to directly form a hairline on the surfaces of products.

According to the present embodiment, it is possible to exhibit the following such functions and effects:

(1) The CAM 21 generates a reference tool path L0 based on shape data of the workpiece W, the setting part 23 sets shape parameters of a hairline corresponding to the long narrow grooves Wa, and the path conversion part 24 converts the reference tool path L0 to the hairline tool path L1 based on the shape parameters. Due to this, it is possible to generate a tool path L1 which is unambiguously determined in accordance with the shape parameters and possible to obtain a hairline pattern with no variation for individual workpieces. Therefore, when machining a hairline on the surface of a mold, it is possible to obtain a plurality of molds with the same shapes as each other and it is possible to easily obtain a large number of shaped articles given the same hairline pattern.

(2) The initial phase α, wavelength λ, and amplitude A of the hairline waveform are set as shape parameters. Therefore, even when the hairline exhibits a waveform shape, it is possible to obtain a hairline pattern with no variation for individual workpieces.

(3) By making the hairline a waveform shape, it is possible to easily form long narrow grooves Wa of different depths at the workpiece surface W0.

(4) The random number string R which is unambiguously determined by the setting values B, C, M, and R0 is used to set the initial phase α, amplitude A, and wavelength λ of the hairline waveform. Therefore, it is possible to change irregularly shapes of the long narrow grooves Wa while being a hairline with reproducibility.

(5) The setting part 23 sets the maximum values and minimum values of the amplitude A and wavelength λ in advance and sets the amplitude A and the wavelength λ within the ranges of the maximum values and minimum values. Therefore, even when using the random number R, it is possible to keep the amplitude A and the wavelength λ within predetermined ranges.

Although, in the above embodiment, the workpiece surface W0 is given a waveform hairline, the hairline is not limit to this in shape. For example, a constant depth hairline may be given to the workpiece surface W0. Therefore, the processing of a parameter setting part comprised of the setting part 23 is also not limited to the one explained above.

Although shape data of the workpiece W (CAD data) is acquired by the CAM 21, a shape data acquisition part may also be provided at the outside of the CAM. Although the CAM 21 generates the reference tool path L0 based on the CAD data, and further a path conversion part 24 separate from the CAM 21 converts the reference tool path L0 to the hairline tool path L1 based on the shape parameters of the hairlines, the path generating part is not limited to this configuration. For example, the CAM itself may be given the function of converting the reference tool path L0 to the hairline tool path L1. Rather than converting the reference tool path L0 to the hairline tool path L1 to determine the tool path L1 for the hairline machining, it is also possible to directly generate the tool path L1 for the hairline machining, based on the CAD data and the shape parameters of the hairline corresponding to the long narrow grooves Wa.

In the above embodiment, a three-axis vertical machining center is used to form the machine tool 100. However, another machine tool may be used so long as it can cause a relative movement of a tool 4 relative to a workpiece W in accordance with a tool path generated by the tool path generating device 20 and form long narrow grooves Wa in a workpiece surface W0. For example, the tool path generating device according to the present invention can be applied to various machine tools such as a horizontal machining center or five-axis machining center, a machine tool other than a machining center, etc. In FIG. 5A and FIG. 5B, the hairline is given at the XZ plane. However, the hairline may also be given to the YZ plane, XY plane, inclined plane, or other flat surface or curved surface.

According to the present invention, since a tool path for a hairline machining is generated based on the shape data of a workpiece obtained by the data acquisition part and shape parameters of a hairline set by the parameter setting part, it is possible to easily form the same shapes of hairline pattern on a workpiece surface.

The invention claimed is:

1. A tool path generating device generating a tool path for machining hairline-shaped long narrow grooves extending in one direction on a workpiece surface, comprising:
   a shape data acquisition part acquiring shape data of a workpiece;
   a parameter setting part setting a shape parameter of a hairline corresponding to the long narrow grooves, the hairline having ranges in which the hairline passes above a reference tool path and ranges in which the hairline passes under the reference tool path; and
   a path generating part generating a reference tool path, comprising a plurality of connected tool paths extending in the one direction and arranged in rows, for generating a surface in the workpiece based on the shape data acquired by the shape data acquisition part and adding to the reference tool path a vertical feature of a shape of the hairline relative to the surface of the workpiece, based on the shape parameter set by the parameter setting part, so that discrete long narrow grooves, along the tool paths, are formed in the surface of the workpiece by machining the surface of the workpiece within the ranges in which the hairline passes under the reference tool path, whereby transforming the reference tool path into a tool path for a hairline machining.

2. The tool path generating device according to claim 1, wherein the parameter setting part sets the shape parameter so that the hairline exhibits a waveform.

3. The tool path generating device according to claim 2, wherein the parameter setting part sets an initial phase, wavelength, and amplitude of the waveform.

4. A hairline machining system machining a hairline-shaped long narrow groove on a workpiece surface, comprising:
   a tool path generating device according to claim 1; and
   a machine tool causing a relative movement of a tool relative to a workpiece, in accordance with a tool path generated by the tool path generating device, and machining the long narrow groove in the workpiece surface.

5. The hairline machining system according to claim 4, wherein the machine tool is configured to machine the workpiece along the reference tool path as well as the tool path made by adding to the reference tool path the vertical feature of the shape of the hairline.

* * * * *